United States Patent
Byun et al.

(10) Patent No.: US 11,206,639 B2
(45) Date of Patent: Dec. 21, 2021

(54) METHOD AND DEVICE FOR TRANSMITTING SCHEDULING REQUEST IN WIRELESS COMMUNICATION SYSTEM

(71) Applicant: LG ELECTRONICS INC., Seoul (KR)

(72) Inventors: Ilmu Byun, Seoul (KR); Jiwon Kang, Seoul (KR); Heejeong Cho, Seoul (KR); Genebeck Hahn, Seoul (KR); Eunjong Lee, Seoul (KR); Heejin Kim, Seoul (KR); Hyunjin Shim, Seoul (KR)

(73) Assignee: LG Electronics Inc., Seoul (KR)

( * ) Notice: Subject to any disclaimer, the term of this patent is extended or adjusted under 35 U.S.C. 154(b) by 607 days.

(21) Appl. No.: 16/078,391

(22) PCT Filed: Feb. 1, 2017

(86) PCT No.: PCT/KR2017/001062
§ 371 (c)(1),
(2) Date: Aug. 21, 2018

(87) PCT Pub. No.: WO2017/146388
PCT Pub. Date: Aug. 31, 2017

(65) Prior Publication Data
US 2020/0288436 A1   Sep. 10, 2020

Related U.S. Application Data

(60) Provisional application No. 62/299,008, filed on Feb. 24, 2016.

(51) Int. Cl.
*H04W 72/04* (2009.01)
*H04W 72/02* (2009.01)
*H04W 72/14* (2009.01)

(52) U.S. Cl.
CPC .......... *H04W 72/04* (2013.01); *H04W 72/02* (2013.01); *H04W 72/14* (2013.01)

(58) Field of Classification Search
CPC .... H04L 5/0091; H04L 5/0053; H04W 72/02; H04W 72/14; H04W 72/1278; H04W 24/10; H04W 72/04; H04W 72/1236
See application file for complete search history.

(56) References Cited

U.S. PATENT DOCUMENTS

| 8,797,968 B2 | 8/2014 | Bertrand et al. |
| 2013/0034071 A1 | 2/2013 | Lee et al. |

(Continued)

FOREIGN PATENT DOCUMENTS

| KR | 101588020 | 1/2016 |
| WO | 2013096555 | 6/2013 |

OTHER PUBLICATIONS

LG Electronics Inc., "How to Realize One SR Procedure with Two PUCCH Cell," R2-156764, 3GPP TSG-RAN WG2 Meeting #92, Anaheim, USA, Nov. 7, 2015, see section 2.

(Continued)

*Primary Examiner* — Mandish K Randhawa
(74) *Attorney, Agent, or Firm* — Dentons US LLP

(57) ABSTRACT

Provided are a method and a device for transmitting a scheduling request in a wireless communication system. Particularly, user equipment receives information on first and second scheduling request resources which is broadcasted from a base station. The user equipment receives information on the first and second scheduling request resources which is transferred specifically to the user equipment from the base station. On the basis of the information, the user equipment selects the first scheduling request (Continued)

resource or the second scheduling request resource. The user equipment transmits a scheduling request via the selected resource.

18 Claims, 13 Drawing Sheets

(56) References Cited

U.S. PATENT DOCUMENTS

2013/0163537 A1* 6/2013 Anderson ......... H04W 72/1284
370/329
2014/0241302 A1* 8/2014 Korhonen ............. H04W 74/02
370/329

OTHER PUBLICATIONS

3GPP TS 36.211 V8.2.0, Mar. 2008.
3GPP TSG-SA WG1 Meeting #71, "Smarter: Use case for Automotive: Automated Cooperative Driving," Qualcomm Incorporated, Belgrade, Aug. 17-21, 2015.

* cited by examiner

METHOD AND DEVICE FOR TRANSMITTING SCHEDULING REQUEST IN WIRELESS COMMUNICATION SYSTEM

CROSS-REFERENCE TO RELATED APPLICATIONS

This application is the National Stage filing under 35 U.S.C. 371 of International Application No. PCT/KR2017/001062, filed on Feb. 1, 2017, which claims the benefit of U.S. Provisional Application No. 62/299,008 filed on Feb. 24, 2016, the contents of which are all hereby incorporated by reference herein in their entirety.

BACKGROUND OF THE INVENTION

Field of the Invention

The present specification relates to wireless communication and, more particularly, to a method for transmitting a scheduling request in a wireless communication system and a device using the same.

Related Art

A wireless communication system is widely deployed to provide various types of communication services, such as voice and data. An object of a wireless communication system is to enable a plurality of terminals to perform reliable communication regardless of their locations and mobility.

In general, a wireless communication system is a multiple access system capable of supporting communication with a plurality of terminals by sharing available radio resources. Examples of radio resources include time, a frequency, code, transmission power and so on. Examples of a multiple access system includes a time division multiple access (TDMA) system, a code division multiple access (CDMA) system, a frequency division multiple access (FDMA) system, an orthogonal frequency division multiple access (OFDMA) system, a single carrier frequency division multiple access (SC-FDMA) system and so on.

A base station (BS) properly allocates radio resources to each piece of user equipment (UE) within a cell through scheduling. The UE may transmit control information or user data to the BS using the allocated radio resources. In this case, a method for transmitting control information and a method for transmitting user data may be different. Furthermore, a method for allocating radio resources for control information and a method for allocating radio resources for user data may be different. Accordingly, radio resources for control information and radio resources for user data may be different. A BS may differently manage radio resources reserved for control information and radio resources reserved for user data.

In a 3GPP LTE system, the time taken for control information or data user to be transmitted on a single subframe is a transmission time interval (TI). In general, the length of a single subframe is 1 ms. However, a next-generation wireless communication system for responding to a change of a higher data rate and a faster channel environment attempts to achieve latency of 1 ms on a user plane. That is, a TI having a length of 1 ms has a structure not suitable for low latency requirements in a next-generation wireless communication system. Accordingly, there is a need for a method for disposing a radio resource structure for satisfying lower latency by controlling a short TTI subdivided from the existing TTI.

SUMMARY OF THE INVENTION

The present specification provides a method and a device for transmitting a scheduling request in a wireless communication system.

The present specification proposes a method for transmitting a scheduling request in a wireless communication system.

Defining terms first, a first scheduling request (SR) resource and a second SR resource are resources for a user equipment (UE) to transmit an SR. The first and second SR resources may be distinguished by having different resource allocation periods. The allocation period of the first SR resource is shorter than the allocation period of the second SR resource. A dedicated SR resource and a common SR resource may be allocated in the first SR resource, and a dedicated SR resource may be allocated in the second scheduling request resource. That is, there is a possibility that a common SR resource is allocated in the first scheduling SR.

First, the UE periodically transmits a channel quality indicator (CQI), a precoding matrix indicator (PMI), and a sounding reference signal (SRS) to a base station (BS). The BS may estimate the location of the UE through PMI information. Here, the PMI information includes a PMI index. A common SR resource or a dedicated SR resource is deployed according to the PMI. That is, the BS notifies the UE of an SR resource change pattern according to the PMI change.

The UE receives information on a first SR resource and information on a second SR resource that are broadcast from the BS. Since the information on the first SR resource and the information on the second SR resource that are broadcast are transmitted in a cell-specific manner, UEs in a cell mainly receive information on the area of an SR resource. The broadcast information on the first SR resource includes a first indicator indicating whether a common SR resource is allocated in the first SR resource. In addition, the broadcast information on the first SR resource may further include a period for the UE to feed back the PMI to the BS and a period for the UE to transmit the SRS to the BS. The information on the first SR resource and the information on the second SR resource that are broadcast are received through a system information block (SIB).

When the first indicator indicates a predesignated value, a common SR resource is allocated in the first SR resource. When the first indicator does not indicate the predesignated value, only dedicated SR resource, not a common SR resource, is allocated in the first SR resource.

The UE receives information on the first SR resource and information on the second SR resource that are transmitted in a UE-specific manner from the BS. Here, since the information on the first SR resource and the information on the second SR resource are transmitted in a UE-specific manner, a specified UE receives specific information on an SR resource. The information on the second SR resource transmitted in a UE-specific manner includes a second indicator indicating that a dedicated SR resource is allocated in the second SR resource when the common SR resource is allocated in the first SR resource (by the first indicator indicating the predesignated value). Here, the UE may receive, through the second indicator, allocation information indicating that the common SR resource is allocated in the first SR resource and allocation information indicating that the dedicated SR resource is allocated in the second SR resource.

The second indicator may further indicate that a dedicated SR resource is not allocated in the second SR resource when a dedicated SR resource is allocated in the first SR resource (as the first indicator does not indicate the predesignated value). That is, since the dedicated SR resource for the specified UE has already been allocated in the first SR resource, it is not necessary to allocate a dedicated SR resource even in the second SR resource.

The UE receives the information on the first SR resource and the information on the second SR resource that are transmitted in a UE-specific manner through a radio resource control (RRC) or a physical downlink control channel (PDCCH).

The UE selects either of the first SR resource and the second SR resource on the basis of the pieces of information on the first and second SR resources that are broadcast and the pieces of information on the first and second SR resources that are transmitted in a UE-specific manner. The UE receives both the allocation information on the first SR resource and the allocation information on the second SR resource but selects one resource for actually transmitting an SR.

There are three methods for a UE to select a resource for transmitting an SR from among the first SR resource and the second SR resource. A third indicator indicating a method for selecting an SR resource is included in the information on the second SR request transmitted in a UE-specific manner.

According to a first method for selecting an SR resource, when the first SR resource and the second SR resource are in the same subframe, the second SR resource is selected. According to a second method, the second SR resource is selected when the second SR resource exists within a maximum SR delay time, and the first SR resource is selected when the second SR resource does not exist within the maximum SR delay time. According to a third method, any one of the first SR resource and the second SR resource is selected according to information on a service that performs an SR using the first and second SR resources.

In the third method, the information on the service that performs the SR using the first and second SR resources includes a radio bearer identifier (ID) or a Quality of Service (QoS) ID.

The UE transmits an SR through the selected resource.

The BS transmits an uplink grant in response to the SR from the UE and allocates a radio resource for the UE to transmit uplink data.

The present specification also proposes a UE (device) for transmitting a scheduling request in a wireless communication system.

Defining terms first, a first SR resource and a second SR resource are resources for a UE to transmit an SR. The first and second SR resources may be distinguished by having different resource allocation periods. The allocation period of the first SR resource is shorter than the allocation period of the second SR resource. A dedicated SR resource and a common SR resource may be allocated in the first SR resource, and a dedicated SR resource may be allocated in the second scheduling request resource. That is, there is a possibility that a common SR resource is allocated in the first scheduling SR.

The UE includes a radio frequency (RF) unit to transmit and receive a radio signal and a processor connected to the RF unit.

The processor receives information on a first SR resource and information on a second SR resource that are broadcast from the BS. Since the information on the first SR resource and the information on the second SR resource that are broadcast are transmitted in a cell-specific manner, UEs in a cell mainly receive information on the area of an SR resource. The broadcast information on the first SR resource includes a first indicator indicating whether a common SR resource is allocated in the first SR resource.

The processor receives information on the first SR resource and information on the second SR resource that are transmitted in a UE-specific manner from the BS. Here, since the information on the first SR resource and the information on the second SR resource are transmitted in a UE-specific manner, a specified UE receives specific information on an SR resource. The information on the second SR resource transmitted in a UE-specific manner includes a second indicator indicating that a dedicated SR resource is allocated in the second SR resource when the common SR resource is allocated in the first SR resource (by the first indicator indicating a predesignated value). Here, the UE may receive, through the second indicator, allocation information indicating that the common SR resource is allocated in the first SR resource and allocation information indicating that the dedicated SR resource is allocated in the second SR resource.

The processor selects either of the first SR resource and the second SR resource on the basis of the pieces of information on the first and second SR resources that are broadcast and the pieces of information on the first and second SR resources that are transmitted in a UE-specific manner. The UE receives both the allocation information on the first SR resource and the allocation information on the second SR resource but selects one resource for actually transmitting an SR.

The processor transmits an SR through the selected resource.

According to the technique proposed in the present specification, even when a BS receives a plurality of SRs at the same time, it is possible to maintain a certain probability that an SR is successfully received in each area. Generally, when UEs recognize the occurrence of an incident through sensing and transmit relevant information, a plurality of SRs is often made at the same time from UEs in the same area rather than UEs in different areas. Thus, according to the proposed technique, it is possible to increase the probability that an SR is received in each area.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink.

For clarity of explanation, the following description will focus on the 3GPP LTE. However, technical features of the present invention are not limited thereto.

Figure 1:
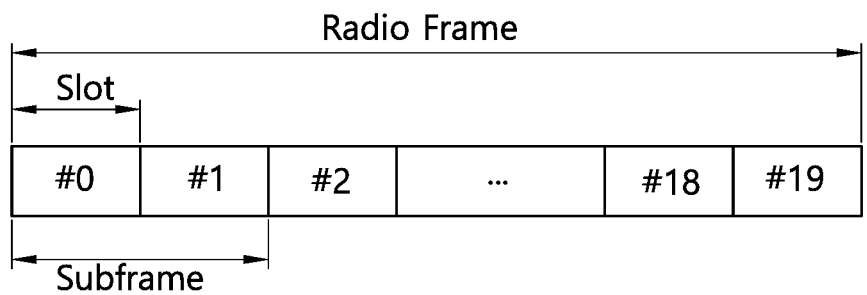
FIG. 1 shows a structure of a radio frame in 3GPP LTE.

FIG. 1 shows a structure of a radio frame in 3GPP LTE.

Referring to FIG. 1, the radio frame consists of 10 subframes. One subframe consists of 2 slots. The slots in the radio frame are numbered from slot number 0 to 19. A time required for transmitting one subframe is defined as a transmission time interval (TTI). The TTI is a unit of scheduling for transmitting a data. For example, one subframe may have a length of 1 millisecond (ms), and one slot may have a length of 0.5 ms.

The structure of the radio frame is for exemplary purposes only, and the number of subframes included in the radio frame or the number of slots included in the subframe and the number of SC-FDMA symbols included in the slot can change variously.

Figure 2:
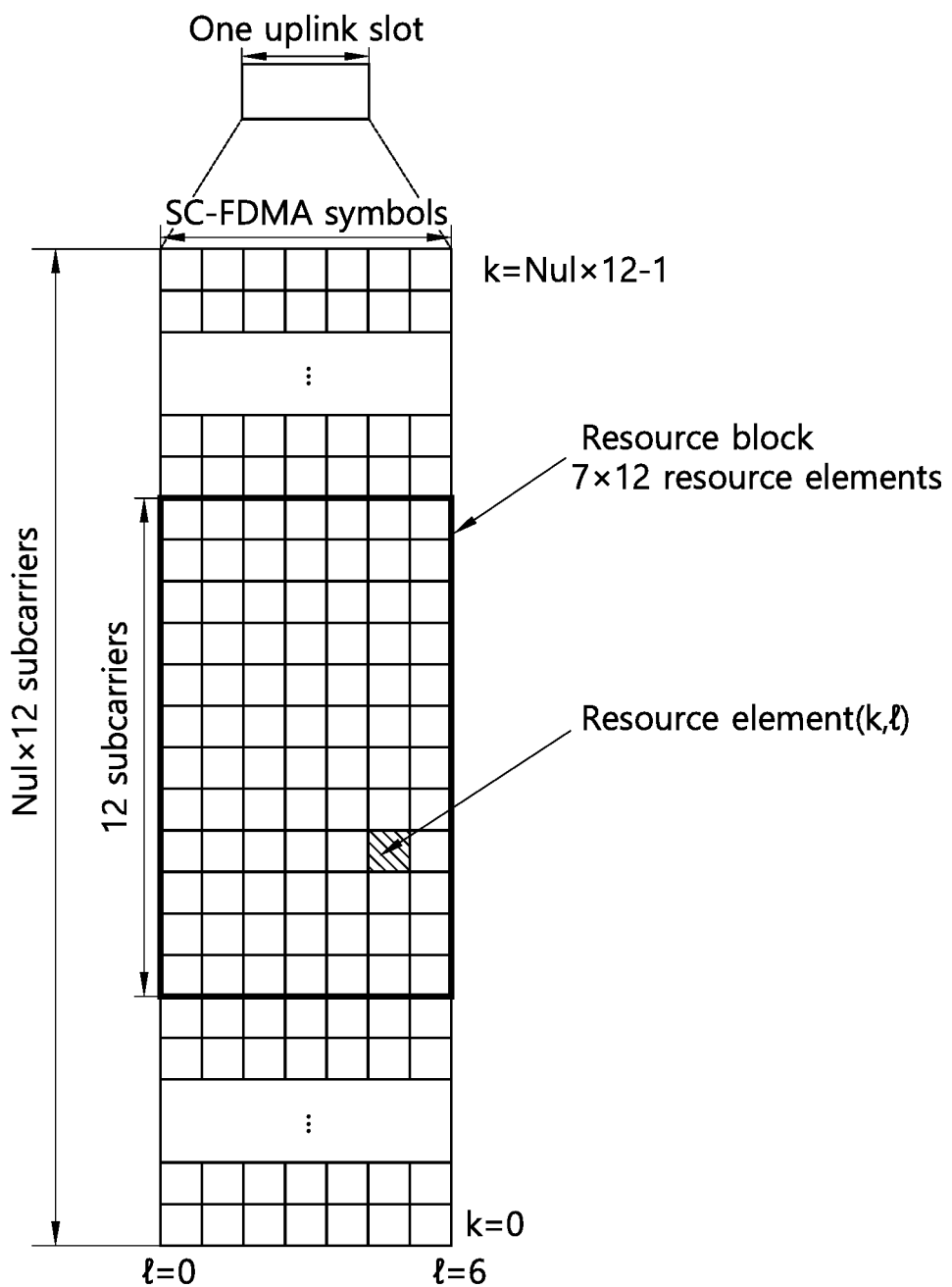
FIG. 2 is a diagram showing an example of a resource grid for one uplink slot in 3GPP LTE.

FIG. 2 is a diagram showing an example of a resource grid for one uplink slot in 3GPP LTE.

Referring to FIG. 2, The UL slot includes a plurality of SC-FDMA symbols in a time domain and includes a plurality of $N^{UL}$ RBs in a frequency domain. It is described that the SC-FDMA symbols are for representing one symbol period, and the SC-FDMA symbols can be OFDM symbols or symbol period according to the system. The RBs are a unit of resource allocation in the frequency domain and include 12 subcarriers. The number $N^{UL}$ of RBs included in the UL slot depends on a UL bandwidth defined in a cell. The UL bandwidth is system information. The UE may know $N^{UL}$ by acquiring the system information.

Each element on the resource grid is referred to as a resource element. One RB includes 12×7 resource elements. The resource element on the resource grid can be identified by an index pair (k, l) within the slot. Herein, k(k=0, ..., $N^{UL}$×12-1) denotes a subcarrier index in the frequency domain, and l(l=0, ..., 6) denotes an SC-FDMA symbol index in the time domain.

Although it is described herein that one RB includes 7×12 resource elements consisting of 7 SC-FDMA symbols in the time domain and 12 subcarriers in the frequency domain for example, the number of SC-FDMA symbols and the number of subcarriers in the RB are not limited thereto. Thus, the number of subcarriers or the number of SC-FDMA symbols included in the RB may change variously. The number of SC-FDMA symbols may change depending on a cyclic prefix (CP) length. For example, when using a normal CP, the number of SC-FDMA symbols included in one slot is 7, and when using an extended CP, the number of SC-FDMA symbols included in one slot is 6.

In 3GPP LTE of FIG. 2, a resource grid for a single uplink slot may also be applied to a resource grid for a downlink slot. In this case, the downlink slot includes a plurality of orthogonal frequency division multiplexing (OFDM) symbols in a time domain.

Figure 3:
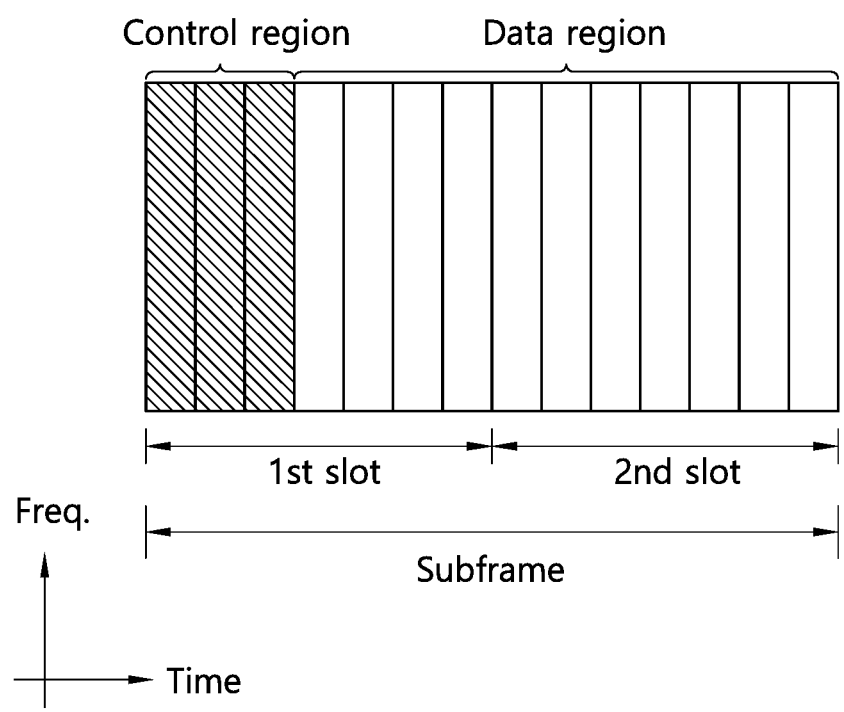
FIG. 3 shows an example of a structure of a downlink subframe in 3GPP LTE.

FIG. 3 shows an example of a structure of a downlink subframe in 3GPP LTE.

Referring to FIG. 3, a downlink subframe includes two contiguous slots. In the first slot of the downlink subframe, a maximum of the former three OFDM symbols become a control region to which a physical downlink control channel (PDCCH) is allocated, and the remaining OFDM symbols become a data region to which physical downlink shared channels (PDSCHs) are allocated. Control channels, such as a physical control format indicator channel (PCFICH) and a physical hybrid-ARQ indicator channel (PHICH), in addition to a PDCCH may be allocated to the control region. In this case, the inclusion of the three OFDM symbols in the control region is only an example. The number of OFDM symbols included in the control region of a subframe may be aware through a PCFICH. A PHICH carries hybrid automatic repeat request (HARQ) acknowledgement (ACK)/not-acknowledgement (NACK) information as a response to uplink data transmission.

A PDCCH may carry a downlink grant that provides notification of the resource allocation of downlink transmission on a PDSCH. UE may read downlink user data transmitted through a PDSCH by decoding control information transmitted through the PDCCH. Furthermore, the PDCCH may carry control information, used for physical uplink shared channel (PUSCH) scheduling, to the UE. The control information used for PUSCH scheduling is an uplink grant that provides notification of the resource allocation of uplink transmission.

A control region consists of an aggregation of a plurality of control channel elements (CCEs). A PDCCH is transmitted on an aggregation of one or some contiguous CCEs. A CCE corresponds to a plurality of resource element groups. A resource element group is used to define the mapping of a control channel to a resource element. In a downlink subframe, if a total number of CCEs is $N_{cce}$, CCE indices of 0 to $N_{cce}$,k−1 are assigned to CCEs. A total number of CCEs within a subframe may also be different in each subframe because the number of OFDM symbols included in a control region within a subframe may be different in each subframe.

Hereinafter, a subframe consisting of N (>=1) OFDM symbols is defined, and a specific radio frame structure in which M (>=0) subframes and P (>=0) special symbols (s-symbols) for a control physical signal or a control information transport channel are bundled is described. This shows a specific radio frame structure designed differently from the example in which 14 contiguous OFDM symbols illustrated in FIG. 1 become one subframe and 10 subframes have one radio frame structure.

Data, a control physical signal, and control information may be transmitted in a subframe, and a control physical signal and control information other than data may be transmitted in a special symbol. Such a time section resource transmission structure may be designated in a UE unit or may be designated so that it is in common applied to all of pieces of UE in a cell or system. At the same time, a transmission structure may be limitedly designated so that it is applied depending on a time or frequency band (subband). If the time section resource transmission structure is designated in a UE unit, UE may be notified of such designation using a UE-specific downlink physical control channel or UE-specific RRC signaling. In the case of the UE-common designation of a BS or network, UE may be notified of the designation using a UE-common downlink physical control channel or UE-common RRC signaling as system information.

Figure 4:
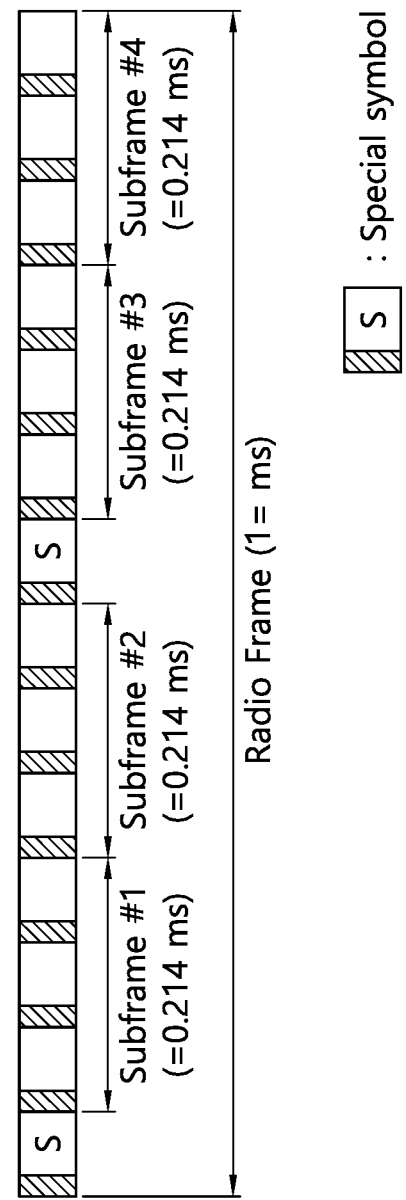
FIG. 4 shows the structure of a radio frame including subframes and special symbols.

FIG. 4 shows the structure of a radio frame including subframes and special symbols.

FIG. 4 illustrates a time section transmission resource structure in which three OFDM symbols (N=3) form a single subframe and four subframes (M=4) and two special symbols (P=2) define a radio frame of 1 ms in length. The length of each subframe is 0.214 ms.

In this case, special symbols within the radio frame may be disposed at equal distances, may be disposed only at a specific location, or may be irregularly disposed. If the role of special symbols is for measurement, detection or the transfer of information, the special symbols may be disposed at equal distances. Special symbols may be irregularly disposed depending on the number of pieces of UE within a cell or a channel characteristic. Some examples in which a special symbol is disposed are described below.

Figure 5:
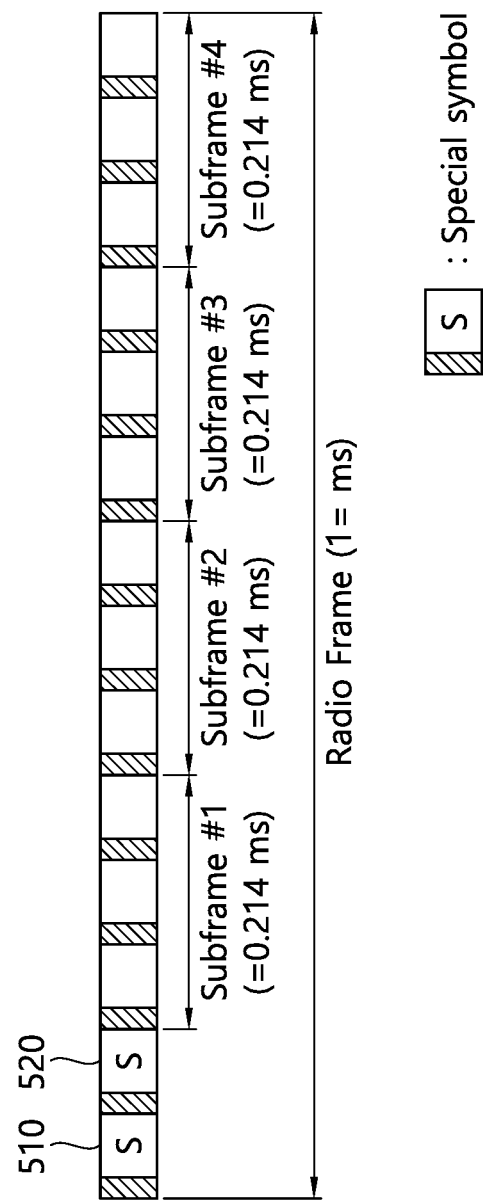
FIG. 5 shows an example of the structure of a radio frame in which special symbols have been contiguously disposed at the front part of the radio frame.
Figure 6:
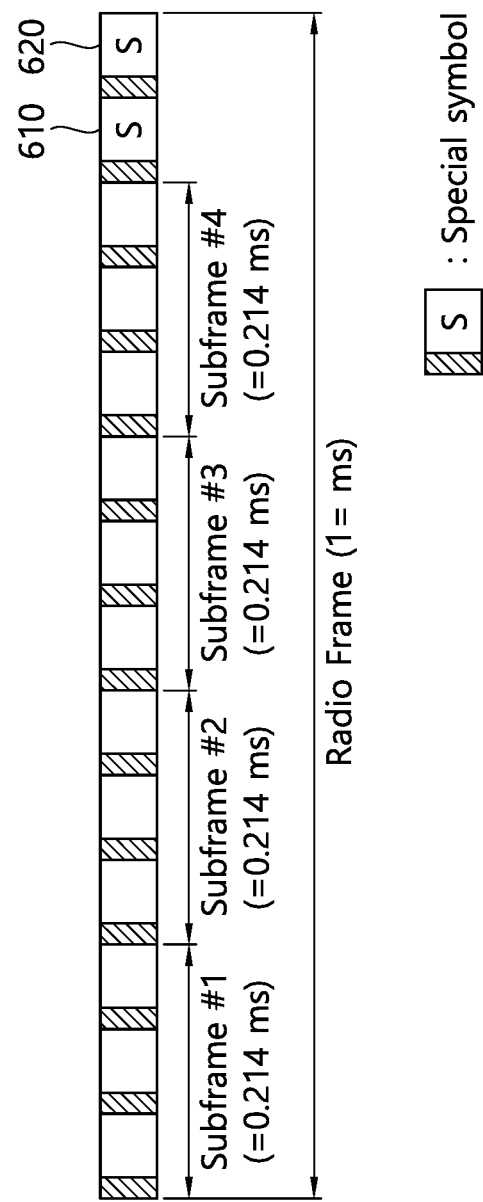
FIG. 6 shows an example of the structure of a radio frame in which special symbols have been contiguously disposed at the back part of the radio frame.

FIG. 5 shows an example of the structure of a radio frame in which special symbols have been contiguously disposed at the front part of the radio frame. FIG. 6 shows an example of the structure of a radio frame in which special symbols have been contiguously disposed at the back part of the radio frame. FIG. 5 shows a transmission resource structure in which special symbols 510 and 520 are contiguously disposed in symbols that are temporally the first two on the radio frame. FIG. 6 shows a transmission resource structure in which special symbols are contiguously disposed in symbols 610 and 620 that are temporally the last two on the radio frame.

In this specification, in the time section transmission resource structure, the locations of special symbols in each radio frame may be different in a radio frame unit or a plurality of radio frame units. If one or a plurality of special symbol is periodically disposed in a radio frame unit, the locations of special symbol in a corresponding cycle may be patterned, and an index may be assigned to the pattern. Alternatively, a BS may notify UE of control information about a bitmap form in a radio frame unit through RRC signaling, may transfer the control information to the UE through a downlink physical data channel using an MAC control element (CE), or may transfer the control information to the UE through a downlink physical control channel.

In this specification, the time section transmission resource structure is specified in a UE unit in frequency division duplex (FDD). Alternatively, the time section transmission resource structure may be applied to both a downlink transmission band and an uplink transmission band or only one of a downlink transmission band and an uplink transmission band with respect to all of pieces of UE within a cell.

Likewise, the time section transmission resource structure may be specified in a UE unit in time division duplex (TDD) or full duplex using specific radio resources for uplink/downlink transmission. Alternatively, the time section transmission resource structure may be applied to both downlink transmission time resources and uplink transmission time resources or only one of downlink transmission time resources and uplink transmission time resources with respect to all of pieces of UE within a cell. From a viewpoint of an uplink/downlink time section resource configuration of TDD, a method for designating downlink transmission resources and uplink transmission resources in a radio frame unit may be applied to the time section transmission resource structure. Alternatively, a method for designating downlink transmission resources and uplink transmission resources in a subframe unit within a radio frame may be applied to the time section transmission resource structure.

That is, in this specification, the time section transmission resource structure is provided on the basis that it may be independently applied to uplink/downlink transmission resources using parameters independently on a physical control channel or RRC signaling. Furthermore, if only a method for simultaneously applying uplink transmission and downlink transmission is used depending on a method for applying a system, the time section transmission resource structure may be applied in common simultaneously using a single parameter on a physical control channel or RRC signaling.

In this specification, the time section transmission resource structure defines a special symbol within a radio frame independently of a subframe. In this case, the special symbol may be used to transmit special cell-common or UE-specific control information. Furthermore, the special symbol may be used to transmit a special cell-common or UE-specific physical signal (e.g., a pilot, a reference signal or a synchronization signal) for the purpose of the measurement or detection of UE. Possible examples of a signal or control information that is transmitted in the special symbol are described below in the case of downlink and uplink.

1. Downlink (1) Transmission of Physical Downlink Control Channel (PDCCH)

A BS transmits a PDCCH, including UE-common control information or pieces of UE-specific control information required to be transmitted from the BS or a specific network radio node to UE through downlink, to the UE through a special symbol. The UE may receive a physical channel, that is, the object of the special symbol. In this case, the PDCCH is basically designed on a frequency resource on a single special symbol, but may be designed on a plurality of symbols resources and frequency resources if a plurality of special symbols is used.

(2) Transmission of Downlink Synchronization Signal

A BS may transmit a downlink synchronization physical signal transmitted so as to obtain the downlink reception synchronization of UE through one or more special symbols. For example, in 3GPP LTE, a primary synchronization signal (PSS) and a secondary synchronization signal (SSS) become the object of a downlink synchronization physical signal. If such a method is applied, the location of a special symbol used to the corresponding object within a specific defined radio frame on time section resources may be designated in a UE-common manner. Furthermore, a BS and UE permanently designate the location of a special symbol without separate signaling.

(3) Transmission of Downlink Channel Measurement Pilot (or Reference Signal)

For the purpose of system downlink control including the support of a determination of the time-frequency resource configuration and transmission method of a packet scheduler adaptive to a radio channel on a radio packet transmission system, a downlink channel measurement pilot is transmitted through one or more special symbols defined separately from a UE data channel transmission time section. Furthermore, UE performs radio channel measurement using a corresponding pilot through a corresponding special symbol. This method may be used as a method for preventing the deterioration of data transmission performance generated because resources for transmitting the existing data channel are excessively used to transmit a pilot signal if a technology in which downlink transmission is performed using a large number of transmission antennas, such as massive MIMO, is used in a mobile communication system. In this case, the massive MIMO may be defined as a transmission method using 16 or more transmission antennas. It is assumed that a downlink channel measurement pilot is transmitted using a plurality of special symbols. In this case, in addition to the multiplexing method of a multiple pilot resource pattern using a basic TDM, FDM method, the multiplexing method of a multiple pilot resource pattern using a CDM method through the application of time section orthogonal code or frequency section orthogonal code may be applied.

(4) Use of Interference Signal Measurement by UE

An operation of allowing UE to measure a downlink reception interference signal of another network radio node or UE other than a network radio node (or BS) that provides service through one or more special symbols may be defined. As a first example, a specific network radio node (or BS) excludes the transmission of a radio signal in all of subcarrier resources or some designated subcarrier resources included in a special symbol on time section transmission resources that are to be used for transmission by the specific network radio node (or BS). Furthermore, UE that is provided with service from a corresponding network radio node may use a method for receiving a specific signal (it may be defined as a pilot or reference signal) of adjacent network radio nodes (or BSs) through the corresponding symbol. In this case, a special symbol transmission signal on a plurality of network radio nodes may be defined as a pilot (or reference signal) for downlink channel measurement. Furthermore, in order to exclude the transmission of a radio signal, all of subcarrier resources within a specific pilot pattern or a corresponding symbol may be specially defined as a null power pilot. As a second example, an operation for the UE interference measurement of the first example may be applied in a situation in which a serving network radio node also transmits a signal by applying a specific resources pattern of a specific pilot (or reference signal) of a specific channel may also be applied.

(5) Transmission of Downlink ACK/NACK Signal for Uplink Data

A downlink ACK/NACK signal for transmitting uplink data is defined as a physical channel on a specific special symbol. A network radio node (or a BS) that receives the uplink data transmits the downlink ACK/NACK signal through the corresponding special symbol. A correction mechanism operation for detecting an error of a system physical layer may be defined so that UE that transmits the uplink data receives the downlink ACK/NACK signal through the corresponding special symbol.

(6) Transmission of Downlink Massive MIMO Beam Scanning Signal

In this specification, a radio network node (or a BS) adopting a time section transmission resource structure also applies a downlink transmission method of massive MIMO. In this case, an operation for transmitting, by a network radio node (or a BS), the transmission of a signature, pilot or reference signal for supporting the UE beam tracking of massive MIMO in a specific cycle through a special symbol and receiving, by UE, the signature, pilot or reference signal through a corresponding special symbol may be defined as applied.

2. Uplink (1) Transmission of an Uplink Synchronization Signal

A method for designing the uplink synchronization signal (e.g., a physical random access channel (PRACH) preamble in 3GPP LTE) of UE in the length of one or a plurality of special symbols and transmitting the uplink synchronization signal may be applied in a situation in which this time section transmission resource structure is applied as an uplink transmission frame structure.

(2) Transmission of Uplink Channel Sounding Signal

An uplink channel sounding signal of UE may be designated to be transmitted through a special symbol on the time section transmission resource structure. If a network radio node (or a BS) instructs the uplink channel sounding signal to be transmitted, a UE-specific uplink data transmission grant at a specific point of time prior to a corresponding special symbol by a designated length (it may be designated in a radio frame or subframe unit) may be triggered in a PDCCH using in a channel sounding transmission indicator. In some embodiments, a UE-specific uplink data transmission grant may be designated using an RRC parameter and signaled to UE when a periodical channel sounding signal is transmitted. In both the methods, a point of time at which the transmission of a UE-specific channel sounding signal is attempted and a resource configuration may be previously designated using an RRC parameter and signaled to UE.

(3) Transmission of Physical Uplink Control Channel (PUCCH)

In a situation in which the time section transmission resource structure is applied as an uplink transmission frame structure, a method for transmitting uplink control information of specific UE through a PUCCH designed on one or a plurality of special symbols may be applied. In this case, the uplink control information of UE may be defined as follows.

Uplink scheduling request information according to a change of the transmission buffer state of UE (data arrival)

Downlink channel measurement information of UE

ACK/NACK information for the reception of downlink data by UE

The type of uplink physical control channel transmitted through one or a plurality of special symbols may be designated by taking into consideration the requirement information about of the above-described uplink control information, that is, a bit size. The type basically includes the following two schemes.

Scheme #1: A method for defining one PUCCH supporting an error generation restriction condition that is required for each piece of information on a bit size of uplink control information of a wide range and being applied to control information cases in common.

Scheme #2: A method for defining an individual PUCCH(s) supporting a maximum size of control information bit and an error requirement condition of corresponding information for each piece of control information in the case where a difference between the bit size of individual uplink control information and a required error generation rate restriction condition is defined to be large and transmitting the individual PUCCH(s) through one or a plurality of special symbols.

(4) Utilization of Interference Signal Measurement by UE

An operation for allowing a network radio node (or a BS) to measure the uplink reception interference signal of another network radio node or UE through one or more special symbols may be defined. As a detailed example, a plurality of pieces of specific UE or a specific network radio node (or a BS) may be designated to transmit a special pilot (or reference signal or signature), that is, an object of interference measurement, using a special symbol. In this case, the specific radio network node (or the BS) may check a surrounding interference situation by receiving and detecting such signals. In this case, the transmission of a corresponding pilot through special symbols of pieces of UEs that are to be received by the specific network radio node (or the BS) through uplink may be excluded. Furthermore, for such a purpose, all of subcarrier resources within a specific pilot pattern or a corresponding symbol may be specially defined as a null power pilot.

A next generation wireless communication system aims to satisfy a user plane latency of 1 ms in order to provide a lower latency service. The user plane latency includes not only the existing TTI length but also an encoding time and a decoding time. The user plane latency in a 3GPP LTE system is about 4.8 ms (encoding time=decoding time=1.5 ms, the existing TTI length=1 ms, target BLER=10%).

In this case, if a sTTI reduced from the existing TTI has a length of 1 to 3 OFDM symbols, the user plane latency may be achieved as 1 ms. That is, in order to achieve the user plane latency of 1 ms, the sTTI must have a length less than or equal to 3 OFDM symbols. If the user plane latency is less than or equal to 1 ms, the existing TTI must be about 1/4.8=0.21 ms. However, ever since the sTTI has a length of 4 OFDM symbols, the user plane latency cannot be achieved as 1 ms. This is because the sTTI is greater than or equal to 0.28 ms ever since the number of OFDM symbols is 4. Herein, it is assumed that the encoding/decoding time is also decreased proportionally in association with a decreased TTI.

Figure 7:
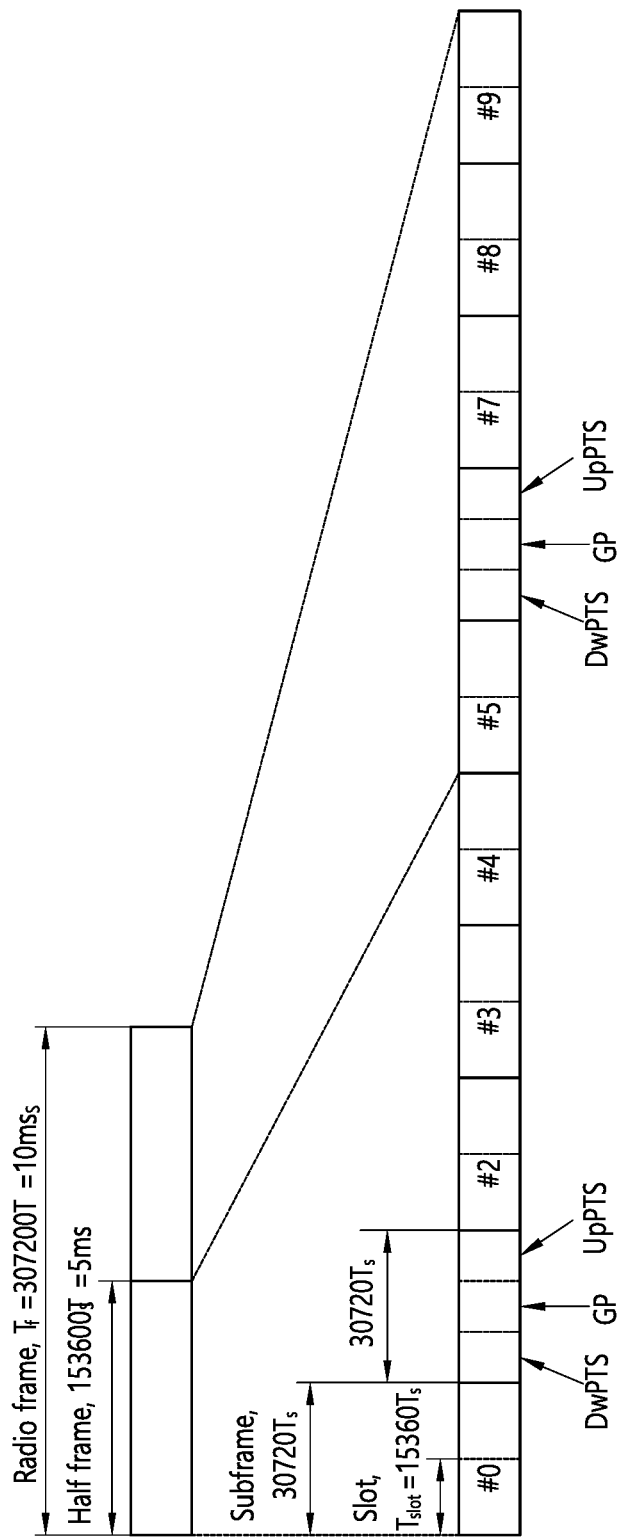
FIG. 7 shows the structure of a TDD radio frame in a 3GPP LTE system.

FIG. 7 shows the structure of a TDD radio frame in a 3GPP LTE system. For more detail, reference may be made to section 4.2 of 3GPP TS 36.211 V8.2.0 (2008-03) "Technical Specification Group Radio Access Network; Evolved Universal Terrestrial Radio Access (E-UTRA); Physical Channels and Modulation (Release 8)". One radio frame has a length of 10 ms and is configured of two half-frames each having the length of 5 ms. Also, one half-frame is configured of 5 subframes each having the length of 1 ms. Herein, one subframe is divided into 2 slots. One subframe is designated as any one of an uplink subframe (UL subframe), a downlink subframe (DL subframe), and a special subframe. One radio frame includes at least one uplink subframe and at least one downlink subframe.

One slot includes a plurality of Orthogonal Frequency Division Multiplexing (OFDM) symbols in a time domain and a plurality of subcarriers in a frequency domain. An OFDM symbol is used to express one symbol period, since the 3GPP LTE uses OFDMA in a downlink. And, therefore, the OFDM symbol may also be referred to as a different term in accordance with the multiplexing access method. For example, in case SC-FDMA is used as an uplink multiplexing access method, the OFDM symbol may be referred to as a SC-FDMA symbol. A resource block (RB) includes a plurality of consecutive (or contiguous) subcarriers within one slot in resource allocation units. However, the structure of the radio frame is merely exemplary. And, therefore, the number of subframes included in a radio frame, the number of slot included in a subframe, or the number of OFDM symbols included in a slot may be diversely varied.

It is defined in 3GPP LTE that one slot includes 7 OFDM symbols in a normal cyclic prefix (CP) and that one slot includes 6 OFDM symbols in an extended CP.

A special subframe is a special period that separates the uplink frame the downlink between an uplink subframe and a downlink subframe. At least one special frame exists in a radio frame, and a special frame includes a Downlink Pilot Time Slot (DwPTS), a Guard Period (GP), and an Uplink Pilot Time Slot (UpPTS). The DwPTS is used for initial cell search, synchronization, or channel estimation. The UpPTS is used for channel estimation by the base station and for establishing uplink transmission (or transport) synchronization of a user equipment. The GP is a guard period for eliminating (or removing) interference that may occur in an uplink due to a multi-path delay (or latency) of a downlink signal between an uplink and a downlink.

Table 1 indicates the structure of a radio frame that can be configured in accordance with the uplink subframe and downlink subframe alignment in a 3GPP LTE TDD system.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' indicates a downlink subframe, 'U' indicates an uplink subframe, and 'S' indicates a special subframe. The special subframe indicates a switching point, i.e., DwPTS+GP+UpPTS. Configurations 0-2 and 6 represent configurations wherein the downlink and the uplink changes at a switching point period (or downlink-to-uplink switch-point periodicity) of 5 ms. At this point, the special subframe exists in both of the 2 half-frames. Configurations 3-5 represent configurations wherein the downlink and the uplink changes at a switching point period of 10 ms. At this point, the special subframe exists only in a first half-frame ($1^{st}$ half-frame) among the 2 half-frames. Subframes 0 and 5 and the DwPTS of the special subframe are always allocated for the downlink transmission. And, the UpPTS of the special subframe and the subframe immediately following the special subframe are always allocated for the uplink transmission.

Table 2 shows a method for configuring the DwPTS, the GP, and the UpPTS, which are considered in a 3GPP LTE system. $T_s$ represents a sampling time and may be calculated as 1/(15000*2048) (sec).

TABLE 2

| Special subframe configuration | Normal CP in DL | | | Extended CP in DL | | |
| --- | --- | --- | --- | --- | --- | --- |
| | | UpPTS | | | UpPTS | |
| | DwPTS | Normal CP in UL | Extended CP in UL | DwPTS | Normal CP in UL | Extended CP in UL |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_S$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

9 different special subframe configurations are available in case of a normal CP, and 6 different special subframe configurations are available in case of an extended CP.

As described above, in a TDD communication system, a specific subframe may be shifted (or changed) to a downlink subframe or an uplink subframe in accordance with time. In case of shifting from an uplink subframe to a downlink subframe, a guard period for the subframe shifting is not required. However, in case of shifting from a downlink subframe to an uplink subframe, a guard period is required. This is because, when performing uplink transmission, each user equipment performs Timing Advance (TA) in order to establish uplink synchronization. Therefore, if a guard period does not exist, the period during which the user equipment receives a downlink signal may overlap with the period during which the user equipment receives an uplink signal.

Since a signal cannot be transmitted or received during the guard period, if an uplink subframe is frequently positioned in succession (or after) a downlink subframe, an overhead of the guard period increases. Therefore, in order to reduce the overhead of the guard period, the application of a method of contiguously (or consecutively) aligning downlink subframes and then contiguously (or consecutively) aligning uplink subframe afterwards is required. For example, in an LTE system, one guard period or two guard periods are positioned among 10 subframes, and downlink subframes or uplink subframes are contiguously aligned between the guard periods. In a cellular communication system, wherein the base station manages scheduling, in case uplink subframes are contiguously aligned, the scheduling of the uplink subframes is performed by a downlink subframe, which is positioned before the uplink subframes.

Figure 8:
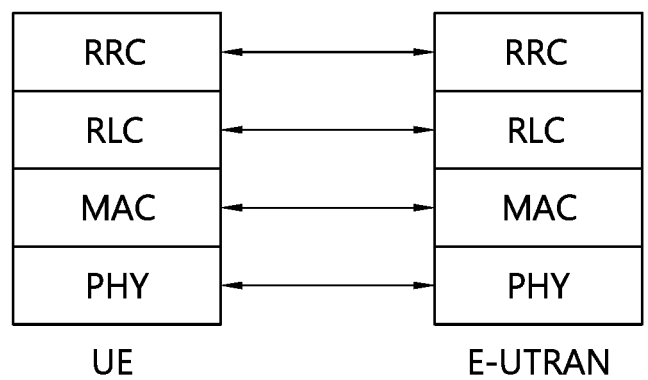
FIG. 8 shows the architecture of a control plane of a radio interface protocol between a UE and an E-UTRAN.
Figure 9:
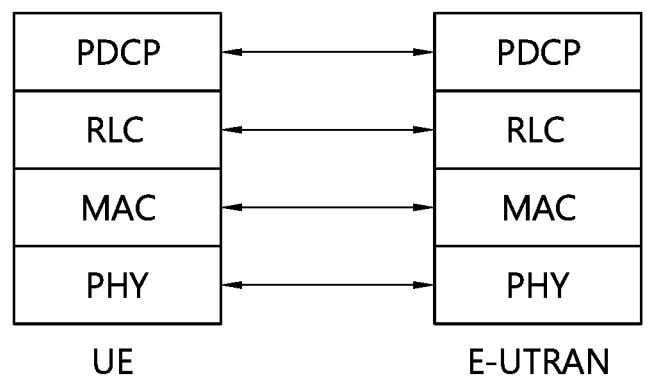
FIG. 9 shows the architecture of a user plane of a radio interface protocol between a UE and an E-UTRAN.

FIGS. 8 and 9 show the architecture of a radio interface protocol between a UE and a UMTS terrestrial radio access network (UTRAN) based on a 3GPP radio access network standard. The radio interface protocol of FIG. 8 horizontally includes a physical layer, a data link layer, and a network layer and vertically includes a user plane for data information transmission and a control plane for carrying a control signal. The protocol layers of FIG. 8 may be divided into a first layer (L1), a second layer (L2), and a third layer (L3) on the basis of three lower layers of the Open System Interconnection (OSI) reference model widely known for communication systems.

Each layer of a control plane of the radio interface protocol of FIG. 8 and a user plane of the radio interface protocol of FIG. 9 will be described hereinafter.

A physical layer, which is the first layer, provides an information transfer service to a higher layer using a physical channel. The physical layer is connected to a higher medium access control layer through a transport channel, through which data is transferred between the medium access control layer and the physical layer. Data is transferred between different physical layers, that is, between physical layers of a transmitting side and a receiving side, through a physical channel.

The medium access control (hereinafter, abbreviated to MAC) layer of the second layer provides a service to a radio link control layer, which is a higher layer, through a logical channel. The radio link control (hereinafter, abbreviated to RLC) layer of the second layer supports transmission of reliable data. A function of the RLC layer may be implemented by a functional block in the MAC. In this case, the RLC layer may not exist. A PDCP layer of the second layer performs a header compression function of reducing the size of an IP packet header, which contains relatively large and unnecessary control information, in order to efficiently transmit an IP packet, such as IPv4 or IPv6, in a radio section having a small bandwidth.

A radio resource control (hereinafter, abbreviated to RRC) layer located at the lowest portion of the third layer is defined only on the control plane and is responsible for controlling a logical channel, a transport channel, and physical channels in relation to configuration, re-configuration, and release of a radio bearer (hereinafter, abbreviated to RB). Here, the RB refers to a service provided by the second layer for data transfer between the UE and the UTRAN.

A downlink transport channel for transmitting data from a network to a UE includes a broadcast channel (BCH) for transmitting system information and a downlink shared channel (SCH) for transmitting user traffic or a control message. Traffic or a control message of a downlink multicast or broadcast service may be transmitted through a downlink SCH or may be transmitted via a separate downlink multicast channel (MCH). An uplink transport channel for transmitting data from a UE to a network includes a random access channel (RACH) for transmitting an initial control message and an uplink SCH for transmitting user traffic or a control message.

A downlink physical channel for transmitting information transferred via the downlink transport channel via a radio section between the network and the UE includes a physical broadcast channel (PBCH) for transmitting information on a BCH, a physical multicast channel (PMCH) for transmitting information on an MCH, a physical downlink shared channel (PDSCH) for transmitting information on a PCH and a downlink SCH, and a physical downlink control channel (PDCCH, also referred to as a DL L1/L2 control channel) for transmitting control information provided by the first layer and the second layer, such as a DL/UL scheduling grant. An uplink physical channel for transmitting information transferred via the uplink transport channel via a radio section between the network and the UE includes a physical uplink shared channel (PUSCH) for transmitting information on an uplink SCH, a physical random access channel (PRACH) for transmitting information on an RACH, and a physical uplink control channel (PUCCH) for transmitting control information provided by the first layer and the second layer, such as HARQ ACK or NACK, a scheduling request (SR), and a channel quality indicator (CQI) report.

Generally, when a UE requires an uplink radio resource, the UE needs to request a radio resource from a BS in order to be allocated a radio resource. When the UE has a PUCCH radio resource for an SR preconfigured by the BS, the UE can request a radio resource from the BS through the PUCCH. Accordingly, the BS allocates an appropriate radio resource to the UE, and the UE transmits data to the BS using the radio resource.

Hereinafter, an SR of a UE for providing a high-reliability low-delay service will be described.

In a high-reliability low-delay service, since a data packet is transmitted in a short TTI (sTTI), a high-capacity bandwidth is required. Therefore, when a plurality of UEs makes an SR in the same TI, a BS cannot perform scheduling for all UEs. For example, if an accident occurs in vehicular communication, when neighboring cars detecting the accident make an SR to a BS at the same time, the BS cannot simultaneously perform scheduling for all the cars.

For this reason, it is necessary for the BS to classify the importance of information in an SR step and to perform scheduling preferentially for important information. A representative method for determining the importance of information is utilizing a Quality of Service (QoS) condition. For example, when the BS knows the QoS condition of a service currently provided for each UE, the BS may determine a scheduling priority according to the QoS when receiving an SR from a plurality of UEs. In a current LTE system, each UE transmits a logical channel group identifier (LCGID) mapped to a plurality of QoSs in a buffer status report (BSR) step, thereby notifying the BS of a scheduling priority. However, this method needs to perform the BSR step and thus increases a delay, making it difficult to satisfy a low delay requirement of a next-generation wireless communication. In order to solve such a problem, a technique for allocating a different SR resource to each UE according to QoS (Mediatek Inc., Smart congestion control for RRC connected mode in LTE-Advanced systems, WO 201513185 A1) has been proposed.

The technique of allocating a plurality of SR resources to a UE and classifying the QoS upon SR increases the number of SR resources to be allocated to a UE. In a low-delay service, since an SR resource needs to be allocated to each UE in a short period, system overheads may be further increased due to an increase in the number of SR resources. Thus, when there are a large number of UEs in a cell, a BS cannot allocate as many SR resources as desired to each UE. For example, it is difficult to adopt the foregoing technique in vehicular communication where 15840 vehicles may exist within a 1.6 km radius from the intersection of three highways with 10 lanes (Qualcomm, 3GPP S1-152275).

Further, the technique of classifying the importance of information only according to the QoS cannot filter out redundant information. For example, when a car accident occurs, neighboring cars detecting the accident can make an RS to a BS, in which case all of the cars make an SR for accident notification having a high QoS. However, since this information is redundant information, the BS does not need to schedule resources for all the cars. When SRs having a high-importance QoS are simultaneously received via different paths, the BS needs to filter out redundant information via the same path and to perform scheduling for cars of different paths. That is, when pieces of information have similar importance levels, it is necessary to preferentially schedule pieces of information which are not redundant, in which the BS can estimate whether information is redundant on the basis of the location of a UE making an SR.

As a method for estimating information redundancy on the basis of the location of a UE, there are a method of allocating an SR resource considering the location of each UE and a method of creating a cluster for each region and setting a cluster head.

In the method of allocating the SR resource considering the location of the UE, an additional SR resource needs to be allocated in order to identify the location. When an SR resource is allocated to express both the QoS and the location of a UE, the overhead of the SR resource is further increased.

There are two methods for creating a cluster for each region. According to one method, each UE in a cluster performs sensing and transmits sensing information to a cluster head, and the cluster head transmits a signal to a BS. Using this method increases a delay and increases the overhead of the cluster head. According to another method, only a cluster head in a cluster performs sensing and transmits corresponding information to a BS. When this method is used, a delay in signal transmission is reduced, but a blind spot that cannot be sensed occurs. In both of the above methods, when each UE moves, it is required to periodically update a cluster and to designate a cluster head each time. Thus, for a mobile UE, signaling overhead is increased.

The present specification proposes a method for allocating an SR resource in consideration of the location of each UE while minimizing an increase in the number of SR resources. That is, the present specification proposes a method for allocating an SR resource considering location information on a UE. Therefore, the present specification can be applied to services in which UEs sense surroundings and transmit sensed information to a BS.

Further, the present specification proposes the operation of a UE in a case where SR resources are divided into a first SR resource and a second SR resource, which have different resource allocation periods, in order to allocate an SR resource in view of location information on the UE. Here, the first SR resource may correspond to a resource including an SR resource and may also be referred to as a first resource. The second SR resource may correspond to a resource including an SR resource and may also be referred to as a second resource.

1. Algorithm for Allocating SR Resource Considering Location Information

An SR resource discussed in the present specification is a logical resource. Logical SR resources may be physically mapped to different resource blocks, different resource elements, different spreading signals, different sequences, different preambles, different physical antennas, and different logical antennas.

A BS may estimate the location of a UE using precoding matrix indicator (PMI) information or an uplink reference signal (e.g., a sounding reference signal (SRS) or an uplink demodulation-reference signal (UL DM-RS) of an LTE system) that the UE transmits to the BS. By distinguishing the location of the UE using a PMI, the BS can quickly identify the location of the UE without assistance of a sensor outside a modem. The technique disclosed in the present specification is not limited to a precoding matrix for a particular multi-antenna, and a PMI used in the present specification includes any information that a UE feeds back to a BS for BS beamforming. For example, in a system where analog beamforming (RF beamforming) is applied, a PMI in the present specification may correspond to a preferred analog (RF) beam index or the index of a preferred preamble (or reference signal). Similarly, in a system in which a reference signal is transmitted in a beamformed form, a PMI may correspond to a beam index or a corresponding antenna port index.

The algorithm is aimed at allocating fewer resources for an SR while maintaining a constant probability of success in an SR. To this end, the algorithm is characterized by allocating an SR resource in view of the location of a UE. When the location of a UE is reflected in an SR resource, the following advantage is obtained. An increasing number of UEs leads to the lack of SR resources. However, when the number of UEs increases, if a particular event occurs, the number of UEs sensing the event also increases. Therefore, when the number of UEs sensing a single event increases, the probability that each UE will successfully transmits an SR may decrease, but the probability that an SR for single event transmission will be successfully transmitted to a BS may be maintained constantly. In services that sense a car accident, a fire, a flood, and the like and transmit relevant information to a BS via an uplink, since an event occurs by area, the probability of successfully transmitting an SR to a BS in each area may be maintained constantly, thereby constantly maintaining the probability of successfully transmitting an SR for each event to a BS.

Main features of the algorithm for constantly maintaining the probability of success in an SR in each area despite an increase in the number of UEs are as follows.

(1) When N SR resources are available for a service, the number of areas in a cell used for SR resource allocation needs to be less than N.

When the number of areas in the cell is greater than N, the areas cannot be distinguished through the SR resources, and thus a BS needs to maintain the number of areas in the cell to be less than or equal to N.

For example, it is assumed that a BS classifies different PMIs as different areas, a UE transmits M types of PMIs to the BS, and M is greater than N. In this case, the M PMIs need to be mapped to N areas through quantization.

(2) At least one of UEs (having a PMI) located in a particular area is allocated a dedicated SR resource that does not overlap with that of other UEs, which is for securing at least one independent SR resource in each area.

For example, when there are three SR resources, UE 1 and UE 2 have the same PMI, and UE 3 and UE 4 have the same PMI, UE 1 and the 3 are allocated respective SR resources, and UE 2 and UE 4 are allocated the same SR resource.

For example, when there are three SR resources, UE 1 to UE 3 have the same PMI, and UE 4 and UE 5 have the same PMI, UE 1 and the 4 are allocated respective SR resources, and UE 2, UE 3, and UE 5 are allocated the same SR resource.

(3) When condition (1) is satisfied, UEs in the same area (having the same PMI) are allocated different SR resources preferentially to UEs in different areas (having different PMIs). That is, when SR resources overlap, UEs in different areas (having different PMIs) are allocated the same SR resource. This is because, in the event of an accident in a particular area, UEs in the area request are highly likely to simultaneously make an SR than UEs in different areas simultaneously make an SR. In addition, even though an accident occurs in an area that a UE allocated a dedicated SR cannot sense, UEs that are not allocated a dedicated SR resource allows a BS to recognize the occurrence of the accident at a certain probability or higher.

For example, when there are two SR resources and UE 1 and UE 2 have the same PMI, UE 1 and UE 2 need to be allocated different SR resources.

For example, when there are two SR resources, UE 1 and UE 2 have the same PMI, but UE 3 has a different PMI, UE 1 and UE 3 are allocated different SR resources and UE 2 is not allocated any SR resource.

(4) Unlike in (3), UEs in the same area (having the same PMI) are preferentially allocated the same SR resource. This is because, in the event of an accident in a particular area, UEs in the same area are highly likely to transmit the same information, and thus a BS can receive the same information even though a resource is scheduled for any UE in the particular area.

For example, when there are two SR resources, UE 1 and UE 2 have the same PMI, but UE 3 has a different PMI, UE 1 and UE 2 are allocated the same SR resource and UE 3 is allocated a different SR resource.

For example, when there are four SR resources, UE 1 to UE 3 have the same PMI, and UE 4 to UE 6 have the same PMI, UE 1 and UE 4 are allocated dedicated SR resources, UE 2 and UE 3 are allocated a common SR resource, and UE 5 and UE 6 are allocated a common SR resource.

(5) In condition (1), in order to remove a UE that is not allocated an SR resource, when the number of SR resources is N, the number of areas in the cell needs to be N−1 or less.

For example, when there are three SR resources, the total number of PMIs is two, UE 1 to UE 3 have the same PMI, and UE 4 to UE 10 have the same PMI, UE 1 and UE 4 are allocated different SR resources and UEs 2, 3, 5 to 10 are allocated the same SR resource.

An SR resource commonly allocated to UEs may be a resource for transmitting a preamble, such as a random access channel of an LTE system.

(6) Condition (2) is reinforced such that UEs in the same area (having the same PMI) are not allocated the same SR resource. Accordingly, it is possible to limit the maximum number of UEs that can make an SR depending on the number of SR resources. When condition (6) and condition (4) are simultaneously applied, it is possible to reduce the probability of a collision between SRs.

For example, when there are three SR resources, the total number of PMIs is two, UE 1 to UE 3 have the same PMI, and UE 4 to UE 10 have the same PMI, UE 1 and UE 4 are allocated different SR resources and UE 2 and UE 5 are allocated the same SR resource. UE 3 and UEs 6 to 10 are not allocated any SR resource.

(7) When a BS receives an SR via a common SR resource (e.g., the same preamble), UEs allocated the common SR resource need to be allocated different physical-layer UE identifiers (e.g., cell-radio network temporary identifiers (C-RNTIs)) so that the BS allocates an uplink resource to any UE among the UEs allocated the same SR resource.

For example, it is assumed that UEs 1 to UE 3 are allocated the same SR resource and UE 1 and UE 2 simultaneously make an SR. A BS cannot know which among UE 1 to UE 3 has made an SR and thus may perform uplink scheduling for (transmit an uplink grant to) all of the three UEs or may perform uplink scheduling only for a random UE. UE 1 to UE 3 need to have different physical-layer UE identifiers in order to identify whether an uplink scheduling signal transmitted by the BS belongs to the UEs.

2. Method for Allocating SR Resource and Operation of UE to Implement Algorithm

When the foregoing algorithm is applied, UEs allocated a common SR resource have a higher probability of not being allocated a resource when transmitting an SR. In addition, when a UE desires to receive a non-area-based service and an area-based service at the same time, it is inappropriate to apply a common SR resource to both services. In order to solve this problem, the present specification proposes a technique in which SR resources are divided into a first SR resource and a second SR resource and a UE allocated a common SR resource in a first SR resource is allocated an additional SR resource in a second SR resource. Generally, a dedicated SR resource and a common SR resource are allocated in a first SR resource, and only a dedicated SR resource is allocated in a second SR resource. Further, a method may be applied in which an SR resource is allocated in a first SR resource on the basis of a location and an SR resource is allocated in a second SR resource regardless of a location.

Figure 10:
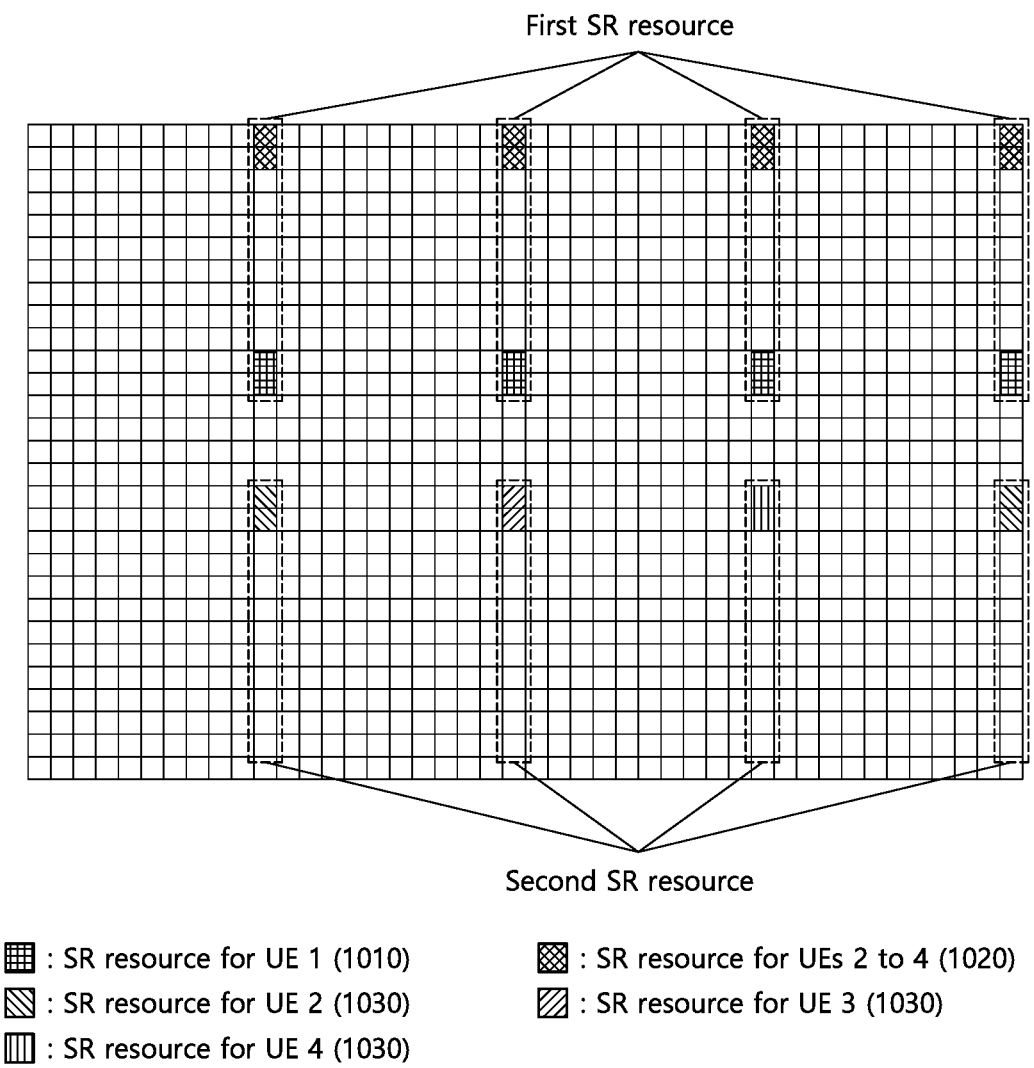
FIG. 10 shows an example of allocating a first scheduling request (SR) resource and a second SR resource according to an embodiment of the present specification.

FIG. 10 shows an example of allocating a first SR resource and a second SR resource are allocated according to an embodiment of the present specification.

Referring to FIG. 10, in the first SR resource, UE 1 is allocated a dedicated SR resource 1010, and UEs 2 to 4 are allocated a common SR resource 1020. UEs 2 to 4 are allocated a dedicated SR resource 1030 in the second SR resource, and the period of the second SR resource is set to be three times longer than the period of the first SR resource.

When a first SR resource allocated to a UE is a dedicated SR resource allocated only to the UE, it is unnecessary to allocate an additional SR resource to the UE. However, when a first SR resource allocated to a UE is a common SR resource (e.g., a random access channel) that is commonly allocated and thus a collision may occur, it is necessary to allocate an SR resource dedicated to each UE.

2.1. Operation Method of UE

A UE that is allocated an SR resource in a first SR resource or a second SR resource may apply the same operation method as that in existing LTE. UEs that are allocated a common SR resource in a first SR resource and are allocated a dedicated SR resource in a second SR resource operate in the following manner. When traffic occurs, a UE selects a resource for transmitting an SR from among the first SR resource and the second SR resource. That is, although being allocated both the first SR resource and the second SR resource or receiving allocation information on both the first SR resource and the second SR resource, the UE actually transmits an SR via one selected resource among the first SR resource and the second SR resource. There are three selection methods in total.

Method 1: Minimum-Time SR Method

The SR is performed using a resource closest to the time when the traffic occurs among the first SR resource and the second SR resource.

When the first SR resource and the second SR resource are located in the same subframe, the SR is performed using the second SR resource.

Method 2: Reliability-Focused SR Method

When the second SR resource exists within the maximum SR delay time required by a service, the SR is performed using the second SR resource.

When the second SR resource does not exist within the maximum SR delay time requested by the service, the SR is performed using the first SR resource.

Method 3: Service-Specific SR Method

A BS notifies the UE of the type of a service that performs an SR using the first SR resource and the type of a service that performs an SR using the second SR resource. On the basis of the received information, the UE designates a resource to be used as an SR resource among the first SR resource and the second SR resource depending on a service.

When determining that the BS has not received an SR via the first SR resource, the UE subsequently transmits an SR using the second SR resource for contention resolution.

2.2. Signaling for Allocating First SR Resource and Second SR Resource

The UE receives signals transmitted by the BS to allocate the first SR resource and the second SR resource to the UE in the order of: 1) information on the first SR resource and information on the second SR resource, which are broadcast by the BS; and 2) information on the first SR resource and information on the second SR resource, which are transmitted by the BS on a per-UE basis.

In 1), the UE receives the information broadcast by the BS in a cell, thereby receiving information on the existence of the first SR resource and the second SR resource and period information on the first SR resource and the second SR resource.

In 2), each UE receives information on an SR resource allocated to the UE from the BS. Each UE may be allocated an SR resource in each of the first SR resource and the second SR resource. Further, the UE receives, from the BS, information on which SR resource is used for each service.

As described above, when the BS broadcasts the information on the first SR resource and the information on the second SR resource, it is possible to reduce overhead of signaling for allocating SR resources, which is performed by the BS for each UE.

2.2.1. Information on First SR Resource and Information on Second SR Resource Broadcast by BS When the BS broadcasts the information on the first SR resource and the information on the second SR resource, the following information may be included.

TABLE 3

| Information on first SR resource | Time resource information | Symbol (subframe) start point and symbol (subframe) numbers or symbol (subframe) start point and end point |
|---|---|---|
| | Frequency resource information | Subcarrier start point and subcarrier numbers or subcarrier start point and end point |
| | Resource allocation period | Resource allocation period is expressed as subframe numbers, TTI numbers, or symbol numbers |
| | Possibility of allocating common SR resource | Corresponding indicator of 0 indicates that only dedicated SR resource can be allocated in a first resource. Corresponding indicator of 1 indicates that a common SR resource can be allocated. |
| | Channel characteristic feedback transmission period | Period in which UE allocated location-based dedicated SR resource feeds back channel characteristic (e.g., PMI) to BS so that BS can estimate UE location When uplink reference signal transmission period is set, this period may not be set. |

TABLE 3-continued

| | | |
|---|---|---|
| | Uplink reference signal transmission period | Period in which UE allocated location-based dedicated SR resource feeds back uplink reference signal (e.g., SRS) to BS so that BS can estimate UE location When channel characteristic feedback transmission period is set, this period may not be set. |
| Information on second SR resource | Time resource information | Symbol (subframe) start point and symbol (subframe) numbers or symbol (subframe) start point and end point |
| | Frequency resource information | Subcarrier start point and subcarrier numbers or subcarrier start point and end point |
| | Resource allocation period | Resource allocation period is expressed as subframe numbers, TTI numbers, or symbol numbers |

2.2.2. Information on First SK Resource and Information on Second SK Resource Transmitted Per UE by BS Since an SR resource is allocated with a shorter period in the first SR resource than in the second SR resource, the BS needs to transmit a signal to the UE more frequently in order to allocate an SR resource. Therefore, the BS includes some information on the first resource when transmitting allocation information on an SR resource in the second resource to an arbitrary UE, thereby reducing signal overhead when allocating an SR resource in the first resource. In addition, the BS transmits information indicating which SR resource the UE is to use according to the service type. Here, the SR resource in the first resource may correspond to the first SR resource, and the SR resource in the second resource may correspond to the second SR resource.

A signal for allocating the SR resource in the second resource includes the following information.

TABLE 4

| | |
|---|---|
| Allocation indicator of SR resource in first resource | Indicator indicating SR resource is allocated in first resource |
| SR method indicator | Information indicated by BS to UE as to which method is used to select SR resource among SR methods illustrated in 2.1 |
| Allocation period of SR resource in first resource | Including information indicating period in which SR resource is allocated |
| Allocation indicator of SR resource in second resource | Indicator indicating SR resource is allocated in second resource |
| Allocation information on SR resource in second resource | Including information indicating time, frequency, and resource allocation period of allocated SR resource |
| Information for selecting SR resource to use in occurrence of data | Embodiment 1: Information on service that transmits SR via first resource in occurrence of data is transmitted. Service information is expressed as data radio bearer ID or QoS ID. For example, services that sense area information and transmit sensing information to BS may be indicated to perform SR via first resource. Embodiment 2: Required delay time and required reliability information of data radio bearer or MAC-layer service type indicator (e.g. LTE LCID) are transmitted. UE designates which resource to use for SR in view of corresponding information and allocation periods of first resource and second resource. |

A signal for allocating the SR resource in the first resource includes the following information.

TABLE 5

| | |
|---|---|
| Allocation information on SR resource in first resource | Including information indicating time and frequency of allocated SR resource |

The signal for allocating the SR resource in the first resource may be transmitted via an L1, L2, or L3 signal.

2.2.3. Information Broadcast by BS in Allocation of First SR Resource to Each UE Based on PMI The following technique may be applied to reduce L, L2 or L3 signaling overhead when the BS estimates the location of the UE using a PMI.

The BS notifies the UE of an SR resource change pattern according to the PMI change. When this technique is applied, the UE can autonomously change an SR resource, thus semi-statically reporting an area-based SR resource. When this technique is used when dynamically allocating an SR resource, it is possible to reduce signaling overhead of a physical layer.

Information on the pattern may be commonly notified to UEs in the cell through broadcast or multicast. The information on the pattern may be notified to each UE when the BS establishes connection with an arbitrary UE or sets a bearer to provide a new service. The information on the pattern may be notified to a UE through a handover signal when the UE is handed over. The information on the pattern may be notified to a UE that is disconnected through a paging signal when updating a tracking area (TA) unit. The information on the pattern may be notified to a UE along with an uplink scheduling resource when the UE performs data transmission in a disconnected state. For example, information in the following table may be broadcast in the cell.

TABLE 6

| PMI index | Common SR resource index |
|---|---|
| 0 | 0 |
| 1 | 1 |
| 2 | 2 |
| 3 | 3 |
| 4 | 4 |

Table 6 shows an example in which all UEs having the same PMI are allocated the same SR resource. In this case, the UE changes a common SR resource thereof while feeding back PMI information thereof to the BS.

The BS notifies the UE of the index of an SR resource available for each PMI either in a cell-common manner or in a UE-specific manner.

Table 7 and Table 8 show examples in which the BS allocates SR resources not to overlap, where a dedicated SR resource allocated not to overlap with those for other UEs is not indicated in the tables. When an accident occurs in a particular area, if the accident can be detected in an adjacent area, an SR may be made in the adjacent area. Therefore, SR resources are also preferentially allocated not to overlap for adjacent PMIs.

Table 7 shows an example in which there are five PMI indexes and ten SR resource indexes.

TABLE 7

| PMI index | SR resource index |
|---|---|
| 0 | 0, 1, 2, 3, 4 |
| 1 | 5, 6, 7, 8, 9 |
| 2 | 0, 1, 2, 3, 4 |
| 3 | 5, 6, 7, 8, 9 |
| 4 | 0, 1, 2, 3, 4 |

Table 8 shows an example in which there are five PMI indexes and 12 SR resource indexes.

TABLE 8

| PMI index | SR resource index |
|---|---|
| 0 | 0, 1, 2, 3 |
| 1 | 4, 5, 6, 7 |
| 2 | 8, 9, 10, 11 |
| 3 | 0, 1, 2, 3 |
| 4 | 4, 5, 6, 7 |

Table 9 and Table 10 show examples in which SR resources allocated not to overlap with those for other UEs are explicitly indicated in the tables. When an accident occurs in a particular area, if the accident can be detected in an adjacent area, an SR may be made in the adjacent area. Therefore, SR resources are also preferentially allocated not to overlap for adjacent PMIs.

Table 9 shows an example in which there are five PMI indexes and ten SR resource indexes.

TABLE 9

| PMI index | Independent SR resource index | SR resource index |
|---|---|---|
| 0 | 0 | 3, 4 |
| 1 | 5 | 7, 8, 9 |
| 2 | 1 | 3, 4 |
| 3 | 6 | 7, 8, 9 |
| 4 | 2 | 3, 4 |

Table 10 shows an example in which there are five PMI indexes and 12 SR resource indexes.

TABLE 10

| PMI index | Independent SR resource index | SR resource index |
|---|---|---|
| 0 | 0 | 2, 3 |
| 1 | 4 | 4, 5, 6, 7 |
| 2 | 8 | 8, 9, 10, 11 |
| 3 | 1 | 2, 3 |
| 4 | 5 | 4, 5, 6, 7 |

On the basis of the illustrated tables, the BS designates an SR resource for the UE according to the change in the PMI of the UE. Accordingly, it is possible to reduce the overhead of the BS sending a signal to the UE.

For example, when the BS transmits Table 7 and the UE feeds back PMI 0, the BS needs to report one of 0 to 4 (SR resource index) to the UE in order to report the PMI index and thus needs to report information of three bits in total. When the BS transmits Table 8 and the UE feeds back PMI 1, the BS can use two bits in total to report which SR resource is allocated to the UE.

It is not necessary to map all PMIs to an SR resource index. For example, when PMIs are divided into vertical beamforming and horizontal beamforming and there is no change in vertical beamforming on a path where a car moves in a cell. Tables 7 to 10 are prepared only for a PMI corresponding to horizontal beamforming.

To reduce signaling overhead, allocation of SR resources according to the PMI is performed not per PMI update but according to a specified period. Generally, since the location of a moving object does not significantly change by several milliseconds, it may be inefficient to update an SR resource per PMI update. In one example, an SR resource may be allocated after a PMI feedback is received L times. In one example, an SR resource may be updated every L TTIs.

When the resolution of a PMI is different from resolution for distinguishing an accident area, PMIs may be grouped and mapped to an SR resource. When a car has a sensing coverage of 100 meters and a beamforming change interval is 50 meters, two PMIs may be managed as a single area.

Table 11 shows an example in which the BS allocates dedicated SR resources not to overlap, where the dedicated SR resources are not indicated in the table. Table 11 shows an example in which there are six PMI indexes and ten SR resource indexes.

TABLE 11

| PMI index | SR resource index |
|---|---|
| 0, 1 | 0, 1, 2, 3, 4 |
| 2, 3 | 5, 6, 7, 8, 9 |
| 4, 5 | 0, 1, 2, 3, 4 |

Table 12 shows an example in which the BS allocates dedicated SR resources not to overlap, where the dedicated SR resources are indicated in the table. Table 12 shows an example in which there are six PMI indexes and ten SR resource indexes.

TABLE 12

| PMI index | Independent SR resource index | SR resource index |
|---|---|---|
| 0, 1 | 0 | 2, 3, 4 |
| 2, 3 | 5 | 6, 7, 8, 9 |
| 4, 5 | 1 | 2, 3, 4 |

Since resolution for distinguishing an accident area may change depending on a service, the SR pattern according to the PMI, transmitted by the BS to the UE, changes according to an indicator for distinguishing a service. When the UE requests uplink communication, the SR pattern according to the PMI, transmitted by the BS to the UE, changes according to a service indicator (e.g., a service classification indicator or preamble of an MAC layer, such as a QoS table index or an LCID, and information included in an SR) transmitted from the UE.

Figure 11:
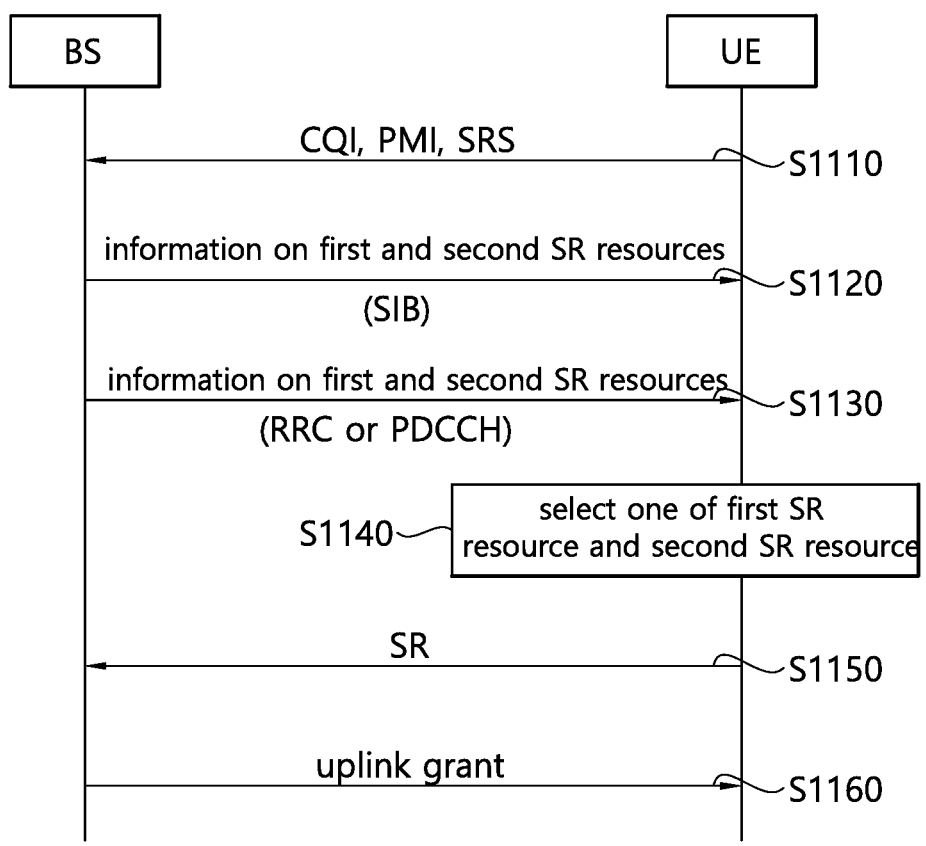
FIG. 11 illustrates a process in which a radio resource is allocated upon an SR according to an embodiment of the present specification.

FIG. 11 illustrates a process in which a radio resource is allocated upon SR according to an embodiment of the present specification.

Generally, when a UE needs an uplink radio resource, the UE needs to request a radio resource from a BS in order to be allocated a radio resource. When the UE has a PUCCH radio resource for an SR preconfigured by the BS, the UE can make a request for a radio resource to the BS through the PUCCH. Accordingly, the BS allocates an appropriate radio resource to the UE, and the UE transmits data to the BS using the radio resource.

Meanwhile, FIG. 11 illustrates a process in which a radio resource is allocated upon SR according to an embodiment of the present specification.

Defining terms first, a first SR resource and a second SR resource are resources for a UE to transmit an SR. The first and second SR resources may be distinguished by having different resource allocation periods. The allocation period of the first SR resource is shorter than the allocation period of the second SR resource. The allocation period of the first SR resource may be the time interval of the first SR resource. The allocation period of the second SR resource may be the time interval of the second SR resource. A dedicated SR resource and a common SR resource may be allocated in the first SR resource, and a dedicated SR resource may be allocated in the second scheduling request resource. That is, there is a possibility that a common SR resource is allocated in the first scheduling SR.

In step S1110, the UE periodically transmits a channel quality indicator (CQI), a precoding matrix indicator (PMI), and a sounding reference signal (SRS) to a BS. The BS may estimate the location of the UE through PMI information. Here, the PMI information includes a PMI index. A common SR resource or a dedicated SR resource is deployed according to the PMI. That is, the BS notifies the UE of an SR resource change pattern according to the PMI change.

In step S1120, the BS broadcasts information on a first SR resource and information on a second SR resource to the UE. Since the information on the first SR resource and the information on the second SR resource that are broadcast are transmitted in a cell-specific manner, UEs in a cell mainly receive information on the area of an SR resource. The broadcast information on the first SR resource includes a first indicator indicating whether a common SR resource is allocated in the first SR resource. In addition, the broadcast information on the first SR resource may further include a period for the UE to feed back the PMI to the BS and a period for the UE to transmit the SRS to the BS. The information on the first SR resource and the information on the second SR resource that are broadcast are received through a system information block (SIB).

Further, the BS may allocate the same first SR resource to different UEs having different temporary identifiers.

When the first indicator indicates a predesignated value, a common SR resource is allocated in the first SR resource. When the first indicator does not indicate the predesignated value, only dedicated SR resource, not a common SR resource, is allocated in the first SR resource.

In step S1130, the BS transmits, to a specified UE, information on the first SR resource and information on the second SR resource that are transmitted in a UE-specific manner. Here, since the information on the first SR resource and the information on the second SR resource are transmitted in a UE-specific manner, the specified UE receives specific information on an SR resource. The information on the second SR resource transmitted in a UE-specific manner includes a second indicator indicating that a dedicated SR resource is allocated in the second SR resource when the common SR resource is allocated in the first SR resource (by the first indicator indicating the predesignated value). Here, the UE may receive, through the second indicator, allocation information indicating that the common SR resource is allocated in the first SR resource and allocation information indicating that the dedicated SR resource is allocated in the second SR resource.

The second indicator may further indicate that a dedicated SR resource is not allocated in the second SR resource when a dedicated SR resource is allocated in the first SR resource (as the first indicator does not indicate the predesignated value). That is, since the dedicated SR resource for the specified UE has already been allocated in the first SR resource, it is not necessary to allocate a dedicated SR resource even in the second SR resource.

The UE receives the information on the first SR resource and the information on the second SR resource that are transmitted in a UE-specific manner through a RRC or a PDCCH.

In step S1140, the UE selects either of the first SR resource and the second SR resource on the basis of the pieces of information on the first and second SR resources that are broadcast and the pieces of information on the first and second SR resources that are transmitted in a UE-specific manner. The UE receives both the allocation information on the first SR resource and the allocation information on the second SR resource but selects one resource for actually transmitting an SR.

There are three methods for a UE to select a resource for transmitting an SR from among the first SR resource and the second SR resource. A third indicator indicating a method for selecting an SR resource is included in the information on the second SR request transmitted in a UE-specific manner.

According to a first method for selecting an SR resource, when the first SR resource and the second SR resource are in the same subframe, the second SR resource is selected. According to a second method, the second SR resource is selected when the second SR resource exists within a maximum SR delay time, and the first SR resource is selected when the second SR resource does not exist within the maximum SR delay time. According to a third method, any one of the first SR resource and the second SR resource is selected according to information on a service that performs an SR using the first and second SR resources.

In the third method, the information on the service that performs the SR using the first and second SR resources includes a radio bearer identifier (ID) or a Quality of Service (QoS) ID.

In step S1150, the UE transmits an SR through the selected resource.

In step S1160, the BS transmits an uplink grant (or a control signal for allocating an uplink resource) in response to the SR from the UE and allocates a radio resource for the UE to transmit uplink data. Alternatively, when receiving an SR via the first SR resource, the BS may transmit an uplink grant (or a control signal for allocating an uplink resource) to all or some UEs that have been allocated the first SR resource.

Figure 12:
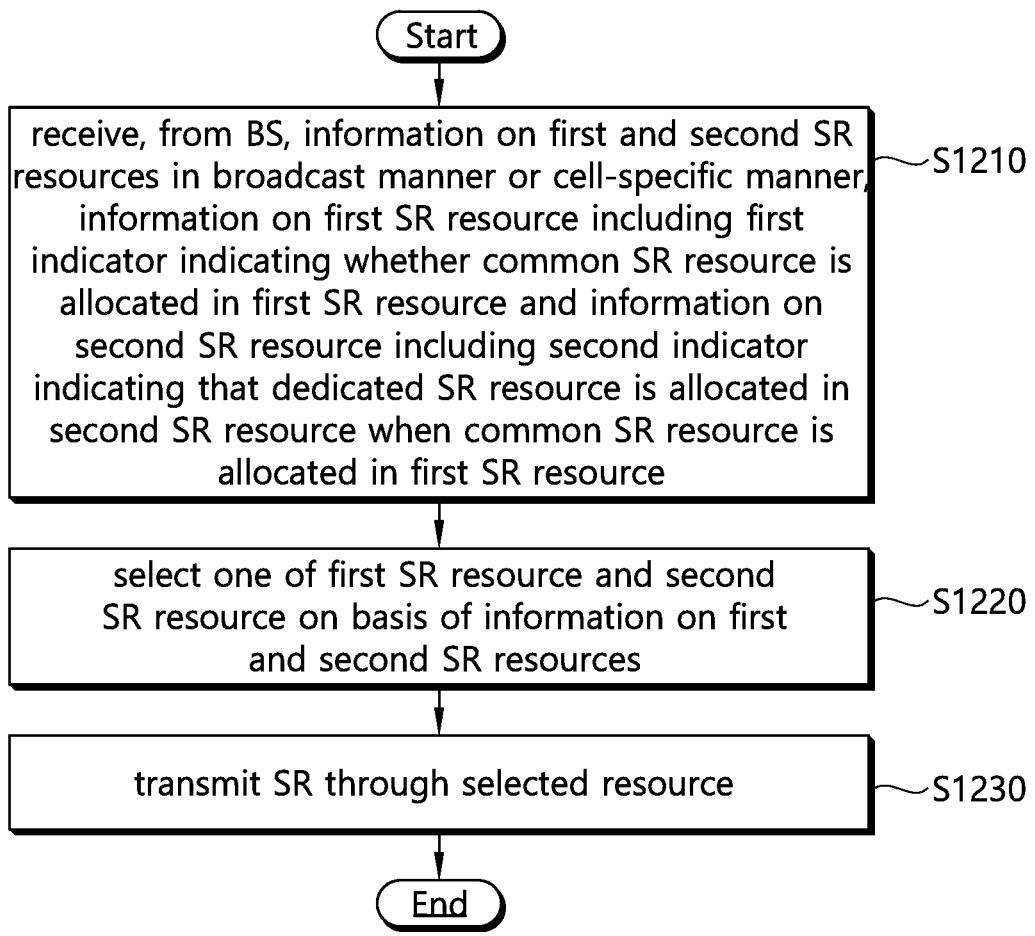
FIG. 12 is a flowchart illustrating a procedure in which a UE transmits an SR according to an embodiment of the present specification.

FIG. 12 is a flowchart illustrating a procedure in which a UE transmits an SR according to an embodiment of the present specification.

Defining terms first, a first SR resource and a second SR resource are resources for a UE to transmit an SR. The first and second SR resources may be distinguished by having different resource allocation periods. The allocation period of the first SR resource is shorter than the allocation period of the second SR resource. A dedicated SR resource and a common SR resource may be allocated in the first SR resource, and a dedicated SR resource may be allocated in the second scheduling request resource. That is, there is a possibility that a common SR resource is allocated in the first scheduling SR.

In step S1210, the UE receives information on a first SR resource and information on a second SR resource that are broadcast from the BS. Since the information on the first SR resource and the information on the second SR resource that are broadcast are transmitted in a cell-specific manner, UEs in a cell mainly receive information on the area of an SR resource. The broadcast information on the first SR resource includes a first indicator indicating whether a common SR resource is allocated in the first SR resource.

Further, the UE receives information on the first SR resource and information on the second SR resource that are transmitted in a UE-specific manner from the BS. Here, since the information on the first SR resource and the information on the second SR resource are transmitted in a UE-specific manner, a specified UE receives specific information on an SR resource. The information on the second SR resource transmitted in a UE-specific manner includes a second indicator indicating that a dedicated SR resource is allocated in the second SR resource when the common SR resource is allocated in the first SR resource (by the first indicator indicating a predesignated value). Here, the UE may receive, through the second indicator, allocation information indicating that the common SR resource is allocated in the first SR resource and allocation information indicating that the dedicated SR resource is allocated in the second SR resource.

In step S1220, the UE selects either of the first SR resource and the second SR resource on the basis of the pieces of information on the first and second SR resources that are broadcast and the pieces of information on the first and second SR resources that are transmitted in a UE-specific manner. The UE receives both the allocation information on the first SR resource and the allocation information on the second SR resource but selects one resource for actually transmitting an SR.

In step S1230, the UE transmits an SR through the selected resource.

Figure 13:
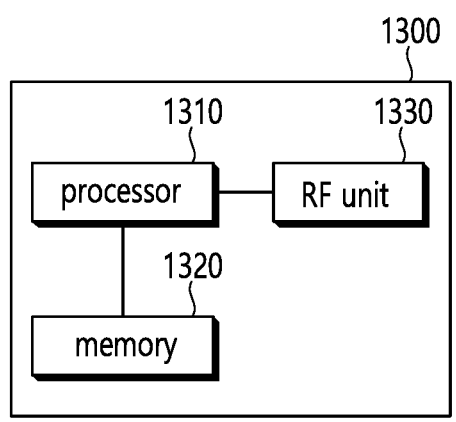
FIG. 13 is a block diagram showing an apparatus for wireless communication for implementing an embodiment of the present invention.

FIG. 13 is a block diagram showing an apparatus for wireless communication for implementing an embodiment of the present invention.

An apparatus 1300 for wireless communication includes a processor 1310, a memory 1320 and a radio frequency (RF) unit 1330.

The processor 1310 may be configured to implement proposed functions, procedures and/or methods described in this description. Layers of the radio interface protocol may be implemented in the processor 1310. The processor 1310 may handle a procedure explained above. The memory 1320 is operatively coupled with the processor 1310, and the RF unit 1330 is operatively coupled with the processor 1310.

The processor 1310 may include application-specific integrated circuit (ASIC), other chipset, logic circuit and/or data processing device. The memory 1320 may include read-only memory (ROM), random access memory (RAM), flash memory, memory card, storage medium and/or other storage device. The RF unit 1330 may include baseband circuitry to process radio frequency signals. When the embodiments are implemented in software, the techniques described herein can be implemented with modules (e.g., procedures, functions, and so on) that perform the functions described herein. The modules can be stored in memory 1320 and executed by processor 1310. The memory 1320 can be implemented within the processor 1310 or external to the processor 1310 in which case those can be communicatively coupled to the processor 1310 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

Furthermore, the technical concepts in the described embodiments may be identically applied, and embodiments in which the number of subframes and the number of special symbols within a radio frame are differently defined may be included in the technical scope of this specification.

What is claimed is:

1. A method for transmitting, by a user equipment (UE), a scheduling request (SR) in a wireless communication system, the method comprising:
receiving, from a base station (BS), information on a first SR resource and information on a second SR resource in a broadcast manner or a cell-specific manner, the information on the first SR resource comprising a first indicator including information on whether a common SR resource is allocated in the first SR resource, and the information on the second SR resource comprising a second indicator including information that a dedicated SR resource is allocated in the second SR resource when the common SR resource is allocated in the first SR resource;
selecting any one of the first SR resource and the second SR resource;
transmitting an SR through the selected SR resource; and
periodically transmitting a channel quality indicator (CQI), a precoding matrix indicator (PMI), and a sounding reference signal (SRS) to the BS,
wherein a location of the UE is estimated by the BS based on the PMI, and
wherein an allocation pattern of the common SR resource or the dedicated SR resource within one resource block is determined based on the PMI.

2. The method of claim 1, wherein the first SR resource has a shorter allocation period than that of the second SR resource.

3. The method of claim 1, wherein when the first SR resource and the second SR resource are in the same subframe, the second SR resource is selected.

4. The method of claim 1, wherein the second SR resource is selected when the second SR resource exists within a maximum SR delay time, and the first SR resource is selected when the second SR resource does not exist within the maximum SR delay time.

5. The method of claim 1, wherein any one of the first SR resource and the second SR resource is selected according to information on a service that performs an SR using the first SR resource and the second SR resource.

6. The method of claim 5, wherein the information on the service that performs the SR using the first SR resource and the second SR resource comprises a radio bearer identifier (ID) or a Quality of Service (QoS) ID.

7. The method of claim 1, wherein the common SR resource is allocated in the first SR resource when the first indicator includes a predesignated value, and the common SR resource is not allocated in the first SR resource when the first indicator does not include the predesignated value.

8. The method of claim 7, wherein the second indicator further includes information that the dedicated SR resource is not allocated in the second SR resource when the dedicated SR resource is allocated in the first SR resource.

9. The method of claim 1, wherein when the information on the first SR resource is received in the broadcast manner, the information on the first SR resource further comprises a period in which the PMI is fed back and a period in which the SRS is transmitted.

10. The method of claim 1, further comprising:
receiving an uplink grant from the BS in response to the SR.

11. The method of claim 1, wherein the information on the first SR resource and the information on the second SR resource are received through a system information block (SIB) when the information on the first SR resource and the information on the second SR resource are received in the broadcast manner, and
the information on the first SR resource and the information on the second SR resource are received through a radio resource control (RRC) or a physical downlink control channel (PDCCH) when the information on the first SR resource and the information on the second SR resource are received in the UE-specific manner.

12. A user equipment (UE) for transmitting a scheduling request (SR) in a wireless communication system, the UE comprising:
a transceiver that transmits and receives a radio signal; and
a processor connected to the transceiver, wherein the processor is configured to:
receive, from a base station (BS), information on a first SR resource and information on a second SR resource in a broadcast manner or a cell-specific manner, the information on the first SR resource comprising a first indicating including information on whether a common SR resource is allocated in the first SR resource, and the information on the second SR resource comprising a second indicating including information that a dedicated SR resource is allocated in the second SR resource when the common SR resource is allocated in the first SR resource;
select any one of the first SR resource and the second SR resource;
transmit an SR through the selected SR resource; and
periodically transmit a channel quality indicator (CQI), a precoding matrix indicator (PMI), and a sounding reference signal (SRS) to the BS,
wherein a location of the UE is estimated by the BS based on the PMI, and
wherein an allocation pattern of the common SR resource or the dedicated SR resource within one resource block is determined based on the PMI.

13. The UE of claim 12, wherein the first SR resource has a shorter allocation period than that of the second SR resource.

14. The UE of claim 12, wherein when the first SR resource and the second SR resource are in the same subframe, the second SR resource is selected.

15. The UE of claim 12, wherein the second SR resource is selected when the second SR resource exists within a maximum SR delay time, and the first SR resource is selected when the second SR resource does not exist within the maximum SR delay time.

16. The UE of claim 12, wherein any one of the first SR resource and the second SR resource is selected according to information on a service that performs an SR using the first SR resource and the second SR resource.

17. The UE of claim 12, wherein the common SR resource is allocated in the first SR resource when the first indicator includes a predesignated value, and the common SR resource is not allocated in the first SR resource when the first indicator does not include the predesignated value.

18. The UE of claim 17, wherein the second indicator further includes information that the dedicated SR resource is not allocated in the second SR resource when the dedicated SR resource is allocated in the first SR resource.

* * * * *